Sept. 2, 1969            T. N. THIELE            3,465,248
PULSING CURRENT PEAK LEVEL MEASURING MEANS
Filed May 29, 1967
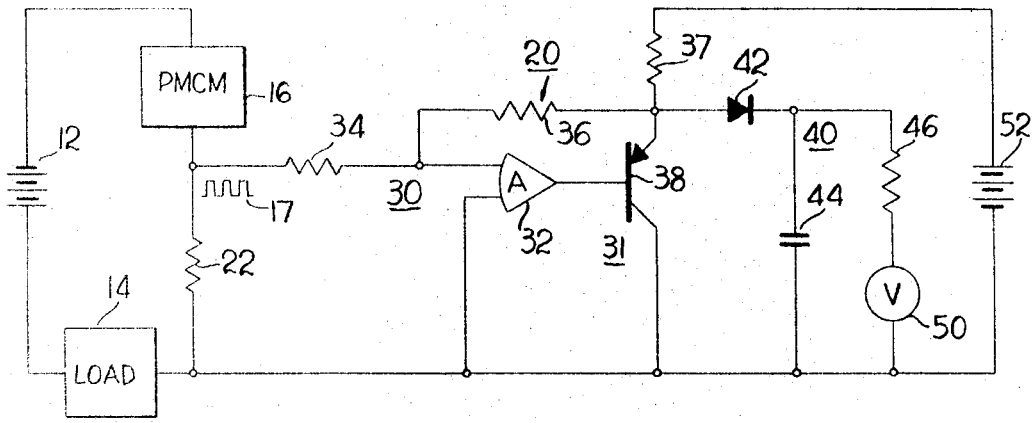

United States Patent Office 3,465,248
Patented Sept. 2, 1969

1

3,465,248
PULSING CURRENT PEAK LEVEL
MEASURING MEANS
Tom N. Thiele, Milwaukee, Wis., assignor to Allis-
Chalmers Manufacturing Company, Milwaukee,
Wis.
Filed May 29, 1967, Ser. No. 642,062
Int. Cl. G01r 19/16
U.S. Cl. 324—103                                    1 Claim

ABSTRACT OF THE DISCLOSURE

A load is energized from a battery through a pulse modulation control system that cyclically turns on and off to provide a controlled average voltage to the load. A measurement of current through the load derived from a shunt and amplified by an operational amplifier controls a common collector transistor amplifier connected to turn on at a conductance varying as a function of the operational amplifier output and, therefore, as a function of the shunt voltage. A capacitor is connected to be charged through a diode to a voltage level varying as a function of the peak conductance of the transistor amplifier and a voltmeter is connected to measure the charge on the capacitor.

This invention relates to electrical measuring means, particularly to means for measuring the peak level of cyclic or periodic current pulses.

Pulse modulation control systems are used to control electrical power to loads such as direct current motors. When these systems operate to control greatly varying power loads as in traction vehicle applications, it is necessary or at least desirable, to provide current limiting circuits that limit the instantaneous maximum current. These limiting circuits require initial and field adjustment to correctly operate at the selected maximum current level.

An oscilloscope or an average current meter are two common devices that can be used to adjust this type of current limit circuit. However, the oscilloscope while having good accuracy is expensive and requires technically qualified personnel and the average current meter while low in cost does not accurately respond to the peak current level. With a device according to this invention, substantially the same accuracy as the oscilloscope can be obtained at a relatively low cost.

The figure is a schematic drawing of a direct current electrical power system using a pulse modulation control system and a pulsing current peak level measuring means or peak current device according to this invention.

Referring to the drawing, a power source, such as a battery 12, is connected to furnish power to a load 14, which would typically be a direct current motor for a traction vehicle. A pulse modulation control means 16 cyclically connects battery 12 to load 14 for varying portions of a cyclic periodic operation to produce a varying output having generally a typical current wave form such as wave form 17. A peak current measuring means 20 comprises means for producing voltage pulses varying as a function of the current pulses, means for amplifying the voltage pulses 30, means for storing electrical energy at a level varying as a function of the amplified peak levels and a means for measuring the stored energy level.

2

The means for producing voltage pulses varying as a function of the current pulses comprises a shunt 22 connected in the electrical power system. Shunt 22 provides a voltage varying directly with the current in the system.

Means for amplifying 30 comprises a constant voltage gain amplification such as linear operational amplifier 32, connected as shown to receive the shunt voltage pulses, having an input resistance 34 and a feedback resistance 36; and a power amplifying means 31 comprising a common collector connected transistor 38 having a load resistor 37 connected in its emitter circuit having its input circuit connected to receive the operational amplifier output.

Means for storing 40 is connected to be charged by the output of power amplifying means 31 and comprises an energy storage device such as a capacitor 44; means such as a diode 42 connected to pass current to capacitor 44 and to block discharge current from capacitor 44 back through transistor 38; and a source of energy such as battery 52 connected in series with the output circuit of transistor 38 to provide charging current for capacitor 44.

The means for measuring the stored energy level comprises a resistance 46 and an indicating means, such as voltmeter 50, connected in series with capacitor 44. The resistance and capacitance are selected to provide a long time constant relative to the period of the current pulses being measured.

In the operation of the circuit shown, the voltage appearing across shunt 22 is applied as an input to operational amplifier 32. When the voltage across shunt 22 is zero, the output of operational amplifier 32 is zero, transistor 38 is fully turned on, and no voltage appears across capacitor 44. When pulse modulation control means 16 turns on, current flows through shunt 22 and the resultant shunt voltage is applied as the input to operational amplifier 32. Transistor 38 receives the amplified voltage output from operation amplifier 32 as its input and its conductance is reduced as a function of the instantaneous level of the input voltage. This produces an output across its emitter-collector terminals that has a signficant preselected level current capability at a voltage that varies as a direct function of the shunt voltage.

The transistor output voltage charges capacitor 44 through diode 42 to a level varying as a function of the voltage peaks, Capacitor 44 cannot discharge back through its charging circuit because of diode 42, and resistor 46 is selected to provide a long time constant (for the resistance 46-capacitance 44 circuit) relative to the cyclic rate of the pulse modulation control means. The voltage of capacitor 44 appears across the series circuit of resistor 46 and voltmeter 50. The reading of voltmeter 50 is correlated to the current in the power system to give a reading of the peak current levels.

The embodiments of the invention in which an exclusive property or privilege is claimed are defined as follows:

1. Means for measuring the peak level of periodic pulses comprising, in combination:
   an operational amplifier receiving said pulses as an input and having substantially constant gain,
   a capacitor, a diode, a resistor, and a power supply coupled in a series loop circuit wherein the diode and power supply have such polarities that the capacitor may be charged to the voltage of the power supply,
   a common collector connected transistor coupled to the output of said operational amplifier and having its emitter and collector electrodes connected in shunt across the diode and capacitor, a feed back resistor coupled between the junction of the diode and the resistor and the input of the operational amplifier, means for indicating the voltage across said capacitor, said indicating means being connected across said capacitor and having resistance and the RC time constant of said capacitor and said resistance being long relative to the period of said pulses.

References Cited

UNITED STATES PATENTS

| 2,931,983 | 4/1960 | Blake | 320—1 XR |
| 3,263,099 | 7/1966 | Bedford | 320—1 XR |
| 3,375,501 | 3/1968 | McCutcheon et al. | 320—1 XR |

RUDOLPH V. ROLINEC, Primary Examiner

ERNEST F. KARLSEN, Assistant Examiner

U.S. Cl. X.R.

324—111